US012651086B2

(12) United States Patent
Song et al.

(10) Patent No.: US 12,651,086 B2
(45) Date of Patent: Jun. 9, 2026

(54) METHOD AND SERVER FOR DEFENDING SERVICE FROM PERSONAL PRIVACY INFERENCE ATTACK

(71) Applicant: The Hong Kong University of Science and Technology, Hong Kong (CN)

(72) Inventors: Yangqiu Song, Hong Kong (CN); Haoran Li, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 820 days.

(21) Appl. No.: 17/985,147

(22) Filed: Nov. 11, 2022

(65) Prior Publication Data

US 2023/0153460 A1    May 18, 2023

Related U.S. Application Data

(60) Provisional application No. 63/278,503, filed on Nov. 12, 2021.

(51) Int. Cl.
*G06F 21/62* (2013.01)
*G06N 3/094* (2023.01)

(52) U.S. Cl.
CPC ......... *G06F 21/6245* (2013.01); *G06N 3/094* (2023.01)

(58) Field of Classification Search
CPC ...... G06F 21/6245; G06F 21/56; G06N 3/094
See application file for complete search history.

(56) References Cited

U.S. PATENT DOCUMENTS 11,132,453 B2 * 9/2021 Wang .................. G06F 21/6254
2021/0064760 A1 * 3/2021 Sharma ................. G06F 21/577

OTHER PUBLICATIONS

Congzheng Song, Ananth Raghunathan "Information Leakage in Embedding Models" [retrieved on Aug. 27, 2025] Retrieved from the Internet <URL: https://arxiv.org/abs/2004.00053> (Year: 2020).*
Rahman, M. A., Rahman, T., Laganière, R., Mohammed, N., & Wang, Y. (2018). Membership inference attack against differentially private deep learning model. Trans. Data Priv., 11(1), 61-79. (Year: 2018).*

(Continued)

*Primary Examiner* — Michael J Huntley
*Assistant Examiner* — Alfredo Campos
(74) *Attorney, Agent, or Firm* — IDEA Intellectual Limited; Sam T. Yip

(57) ABSTRACT

A computer-implemented method for preventing leaking a personal privacy from a chatbot under black-box personal attribute inference attack is provided. The chatbot is provided via a neural network executed by a processor of a server. The method includes: training, by the processor, a Language Model (LM) of the chatbot according to utility objectives; applying, by the processor, one or more defense objectives with personal attribute predictor to fine-tune a target LM of the chatbot by using a fake attacker model and pre-define attributes with annotated datasets; and using, by the processor, the target LM on the chatbot to defend inference attack, such that the personal privacy of content inputted and sent to the chatbot cannot be predicted by external predictor and a security level of the chatbot is assured.

13 Claims, 6 Drawing Sheets

(56)         References Cited

OTHER PUBLICATIONS

Maximin Coavoux, Shashi Narayan, Shay B. Cohen "Privacy-preserving Neural Representations of Text" [retrieved on Aug. 27, 2025] Retrieved from the Internet <URL: https://arxiv.org/abs/1808.09408> (Year: 2021).*

M. Rao et al., "Do as I Mean, Not as I Say: Sequence Loss Training for Spoken Language Understanding," ICASSP 2021—2021 IEEE International Conference on Acoustics, Speech and Signal Processing (ICASSP), Toronto, ON, Canada, 2021, pp. 7473-7477 , doi: 10.1109/ICASSP39728.2021.9414566. (Year: 2021).*

Yizhe Zhang et al., "DIALOGPT: Large-Scale Generative Pre-training for Conversational Response Generation," Proceedings of the 58th Annual Meeting of the Association for Computational Linguistics, 2020, pp. 270-278.

Thomas Wolf et al., "TransferTransfo: A Transfer Learning Approach for Neural Network Based Conversational Agents," Association for the Advancement of Artificial Intelligence, 2019.

Weizhou Shen et al., "DialogXL: All-in-One XLNet for Multi-Party Conversation Emotion Recognition," The Thirty-Fifth AAAI Conference on Artificial Intelligence, 2021, pp. 13789-13797.

Alec Radford et al., "Language Models are Unsupervised Multitask Learners," 2019.

Zhilin Yang et al., "XLNet: Generalized Autoregressive Pretraining for Language Understanding," 33rd Conference on Neural Information Processing Systems, 2019.

Nicholas Carlini et al., "Extracting Training Data from Large Language Models," USENIX Security Symposium, 2021.

Cynthia Dwork et al., "The Algorithmic Foundations of Differential Privacy," Foundations and Trends in Theoretical Computer Science, 2014, vol. 9.

Sean Welleck et al., "Neural Text Generation With Unlikelihood Training," 2019.

Congzheng Song et al., "Overlearning Reveals Sensitive Attributes," 8th International Conference on Learning Representations, 2020.

Anna Tigunova et al., "Listening between the Lines: Learning Personal Attributes from Conversations," International World Wide Web Conference, 2019.

Chien-Sheng Wu et al., "Getting To Know You: User Attribute Extraction from Dialogues," LREC, 2020.

Eric Lehman et al., "Does BERT Pretrained on Clinical Notes Reveal Sensitive Data?" Proceedings of the 2021 Conference of the North American Chapter of the Association for Computational Linguistics: Human Language Technologies, 2021, pp. 946-959.

Santiago Zanella-Béguelin et al., "Analyzing Information Leakage of Updates to Natural Language Models," Proceedings of the 2020 ACM SIGSAC Conference on Computer and Communications Security, 2020, pp. 363-375.

Mohammad Malekzadeh et al., "Honest-but-Curious Nets: Sensitive Attributes of Private Inputs Can Be Secretly Coded into the Classifiers' Outputs," ACM Conference on Computer and Communications Security, 2021.

Yukun Zhu et al., "Aligning Books and Movies: Towards Story-like Visual Explanations by Watching Movies and Reading Books," 2015 IEEE International Conference on Computer Vision (ICCV), 2015, pp. 19-27.

Xudong Pan et al., "Privacy Risks of General-Purpose Language Models, " 2020 IEEE Symposium on Security and Privacy, 2020, pp. 1314-1331.

* cited by examiner

S210

Training a Language Model (LM) of a chatbot according to utility objectives

S220

Applying one or more defense objectives with personal privacy predictor to fine-tune a target LM of the chatbot by using a fake attacker model and pre-define attributes with annotated datasets

S230

Using the target LM on the chatbot to defend inference attack

Attacker model

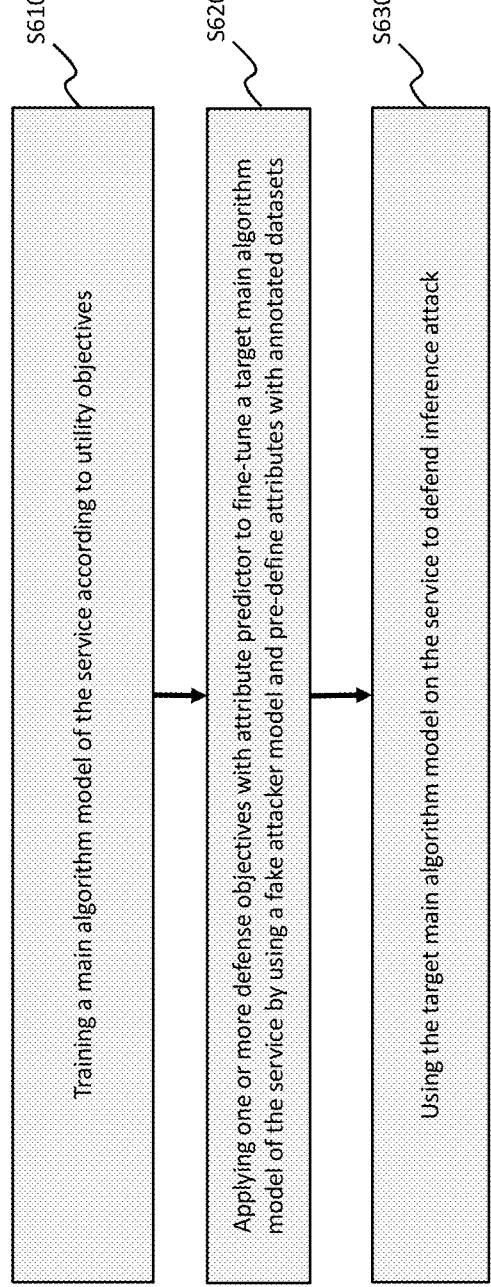

S610

Training a main algorithm model of the service according to utility objectives

S620

Applying one or more defense objectives with attribute predictor to fine-tune a target main algorithm model of the service by using a fake attacker model and pre-define attributes with annotated datasets

S630

Using the target main algorithm model on the service to defend inference attack

FIG. 6

METHOD AND SERVER FOR DEFENDING SERVICE FROM PERSONAL PRIVACY INFERENCE ATTACK

COPYRIGHT NOTICE

FIELD OF THE INVENTION

The present invention generally relates to privacy protection, and in particular, to a method and server for performing a personal privacy protection of a service provided via neural network, so as to prevent leaking the personal privacy from the service under personal privacy inference attack.

BACKGROUND OF THE INVENTION

Social chatbots have been widely used to benefit many applications from answering factual questions to showing emotional companionship. With recent progress in large pretrained language models, some attempts are made to build chatbots based on large generative language models like GPT-2 (Generative Pre-trained Transformer 2) and XLNet. To train such language modeling (LM) based chatbots, private conversations are collected. Unfortunately, large language models tend to memorize training data and some private data can be recovered from models via black-box training data extraction attacks.

Recent studies propose differential privacy and unlikelihood training to mitigate the memorization issue. Besides such memorization problems, hidden representations of machine learning models with simple objectives may reveal sensitive attributes of inputs. However, few studies consider the overlearning problem with LM.

Therefore, problems such as: how to prevent the chatbot from leaking personal privacy information under a black-box personal privacy information inference attack, and how to prevent overlearning problem of the LM of the chatbot without decreasing the performance of the chatbot are the subjects to which people skilled in the art devote.

SUMMARY OF THE INVENTION

In accordance to one aspect of the present invention, a computer-implemented method for preventing leaking a personal privacy from a chatbot under black-box personal attribute inference attack is provided. The chatbot is provided via a neural network executed by a processor of a server. The method includes: training, by the processor, a Language Model (LM) of the chatbot according to utility objectives; applying, by the processor, one or more defense objectives with persona predictor to fine-tune a target LM of the chatbot by using a fake attacker model and pre-define attributes with annotated datasets; and using, by the processor, the target LM on the chatbot to defend inference attack, such that the personal privacy of content inputted and sent to the chatbot cannot be predicted by external predictor and a security level of the chatbot is assured.

In accordance to another aspect of the present invention, a computer-implemented method for preventing leaking a personal privacy from a service under personal privacy inference attack is provided. The service is provided via a neural network executed by a processor of a server. The method includes: training, by the processor, a main algorithm model of the service according to utility objectives; applying, by the processor, one or more defense objectives with attribute predictor to fine-tune a target main algorithm model of the service by using a fake attacker model and pre-define attributes with annotated datasets; and using, by the processor, the target main algorithm model on the service to defend inference attacks, such that the personal privacy of content inputted and sent to the service cannot be predicted by external predictor and security level of the service is assured.

In accordance to another aspect of the present invention, a server is provided, and the server includes one or more processors configured to execute machine instructions to implement methods described above.

BRIEF DESCRIPTION OF THE DRAWINGS

Embodiments of the invention are described in more details hereinafter with reference to the drawings, in which:

FIG. 6 depicts a flowchart of defending a service by improving the training process of main algorithm model of the service.

DETAILED DESCRIPTION

Figure 1:
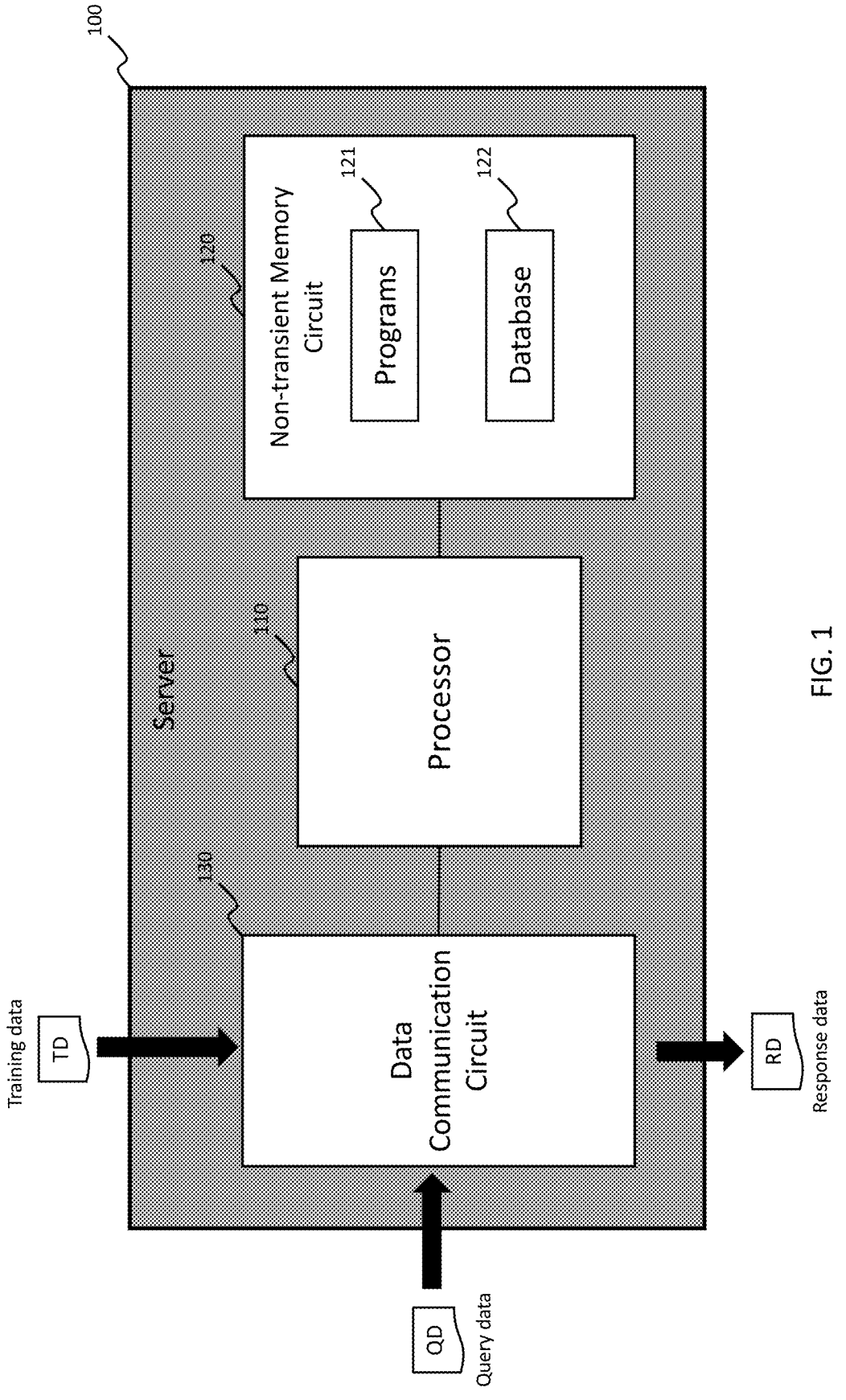
FIG. 1 depicts a block diagram illustrating an electronic device in accordance with one embodiment of the present invention.

In the following description, a method and a server configured to implement the same for performing a personal privacy protection of a service (e.g., chatbot) provided via neural network to prevent leaking the personal privacy (e.g., persona) from the service under personal privacy inference attack (e.g., black-box persona inference attack) and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In the presented disclosure, a fine-tuned GPT-2 is the language model used for the chatbot. Firstly, a black-box attack is provided/generated to exploit final hidden states before the LM head of GPT-2 (Generative Pre-trained Transformer 2) to infer personas of corresponding speakers with a simple neural network. The LM head is also a projection matrix, and then final hidden representations perform matrix multiplication with softmax activation to obtain word distributions, such that decoding algorithms can be used to output words for responding the initiated conversation. It should be mentioned that the language model used for the chatbot can be other type of the algorithm model, such as, RNN (recurrent neural network), XLNet and T5 (Text-to-Text Transfer Transformer).

Secondly, an embodiment shows that an overlearning can happen for LM based chatbots to reveal personas of speakers (Overlearning might be a broad concept. The success of inference attacks is likely to be caused by the overlearning issue. The provided defense is effective against inference attacks, but if it can avoid the overlearning problems is still unknown. In fact, overlearning commonly happens for many machine learning tasks). A single external multi-layer perception (MLP) attacker model is built, which is capable of inferring speakers' personas with 37.59% accuracy over 4332 personas. The high accuracy of the simple external model implies that the hidden states have potential vulnerabilities to reveal speakers' personal privacy attributes. Thus, it is necessary to improve training algorithms to prevent such overlearning issues, so as to avoid the successful persona inference attack.

Lastly, defense learning strategies are applied on the GPT-2 to prevent such black-box attacks. A KL Loss combined with MI Loss is provided as additional defense objectives to train the GPT-2, such that the attacker's persona inference accuracy can be decreased to 0.53%. The GPT-2 is built by stacking transformer decoder blocks, then the LM head takes the hidden representations of final decoder block as inputs and output tokens (words). For training, token representations are inputted to the GPT-2 model and cross entropy loss between current input token and next input token is calculated to encourage the model to predict next word given current word. For inference (after training) process, prefix tokens (or simple <bos> token that indicates the "begin of sentence") is inputted, then GPT-2 is used to generate a word based on the prefix. This word also becomes the next input for GPT-2. This procedure is repeated to generate sentence word by word till the end of sentence token <eos> is reached or the length exceeds our model's limit.

The contributions of the presented invention can be summarized as follows:

The hidden persona inference attack for LM based chatbots is disclosed and analyzed by the presented disclosure and it is treated as a privacy risk.

An effective defensive training algorithm is provided to prevent hidden states from leaking personas of the corresponding speakers by mutual information minimization and uniform distribution approximation.

Extensive experiments are conducted to quantify both privacy and utility of proposed defense mechanisms. Besides solving the persona leakage issue, the results of the experiments demonstrate that the proposed training algorithm for defending the chatbot has nearly no negative influence on utility.

Referring to FIG. 1 in the following description. In accordance with various embodiments of the present invention, provided is a server 100 that includes a processor 110, a non-transient memory circuit 120 and a data communication circuit 130.

The non-transient memory circuit 120 is configured to store machine instructions (or programs) 121 and to host the database 122. The database 122 may be used to store parameters/models for functioning the chatbot, query data QD, training data TD, and/or response data RD.

The data communication circuit 130 is configured to establish the network connection(s) for receiving the object data OD, and the network connection(s) can be wired or wireless data communication connection(s). Furthermore, the data communication circuit 130 is configured to establish a further network connection for sending the result data RD. For example, the query data QD can be sent by another electronic device (e.g., mobile device, PC, electrical vehicle), and the query data QD includes message inputted by a user of another electronic device and auxiliary data, wherein the auxiliary data includes: an identification of the electronic device and/or the user. The response data RD may include a response content generated according to the content of the query data QD. The training data TD is configured to train the language model used by the chatbot of the server, and the training data TD includes contents or conversations of corresponding user(s), and attributes/tag information related to the corresponding user(s). Some detail of the training data TD may refer, for example, Table 1 recited below.

TABLE 1

| Statistics of the training dataset | |
| --- | --- |
| Stat Type | Value |
| Dialogs | 10,907 |
| Utterances(turns) | 162,064 |
| Unique personas | 4,332 |
| Total personas | 98,056 |
| Labeled turns | 32,147 |
| Avg. turns per dialog | 14.86 |
| Avg. labeled turns per dialog | 2.95 |
| Avg. words per turn | 11.71 |

Basically, training data TD is a dataset collected from open domain conversations where speakers are assigned personas. In addition, these conversations should reflect speakers' given personas.

The processor 110 executes the machine instructions 121 to implement methods provided by the presented disclosure.

Figure 2:
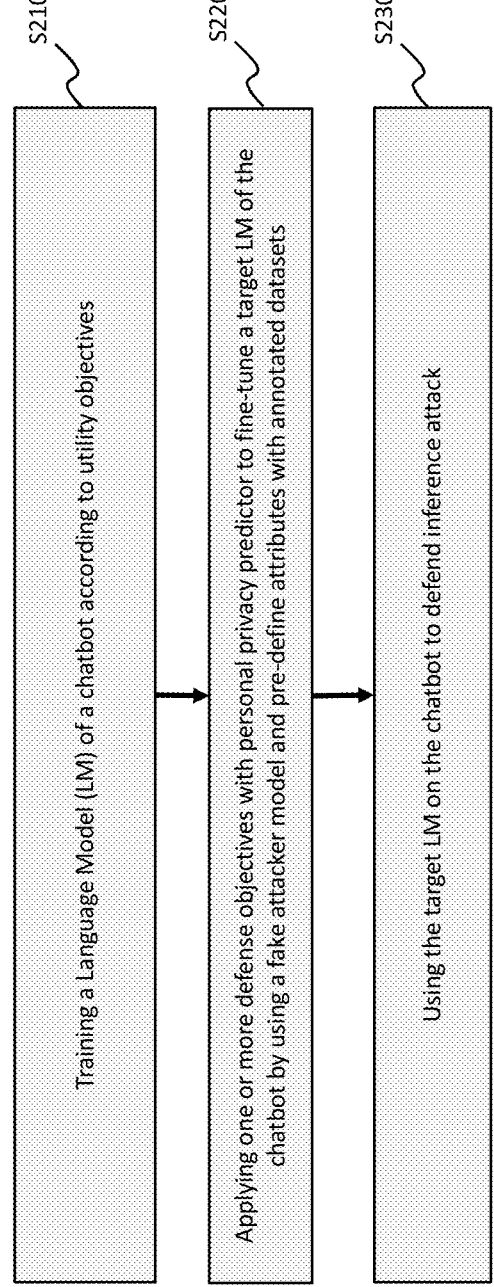
FIG. 2 depicts a flowchart of defending a chatbot by improving the training process of language model of the chatbot.

Referring to FIG. 2, in step S210, the processor 110 trains a Language Model (LM) of a chatbot according to utility objectives (by training data TD). The utility objectives comprising a LM loss.

Next, in step S220, the processor 110 applies one or more defense objectives with persona predictor to fine-tune a target LM of the chatbot by using a fake attacker model and the trained LM and pre-define attributes with annotated datasets. The fake attacker model is used towards the trained LM (e.g., the fine tuned target LM). The defense objectives comprising one or a combination of following: a KL (Kullback-Leibler) loss; and a MI (Mutual information) loss. Because during actual attacks, the detail of the real attacker model cannot be obtained to update the LM, this is why a fake attacker (adversary) is used as a rehearsal to update the LM.

Figure 3:
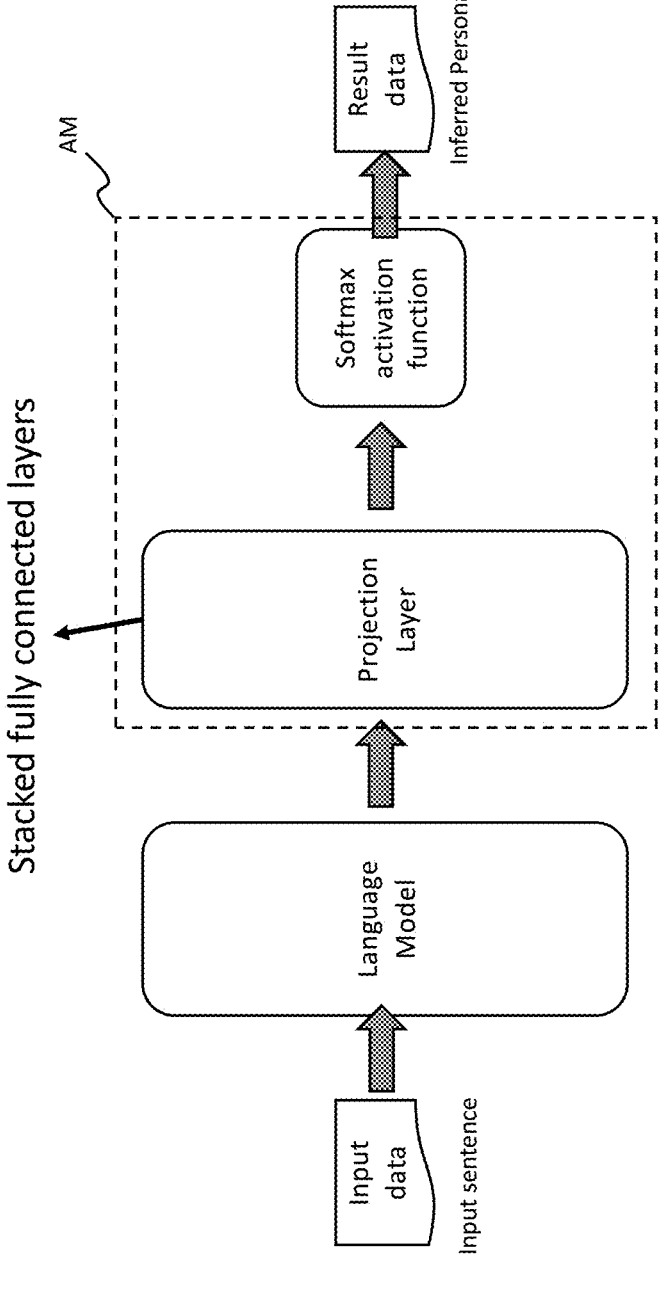
FIG. 3 depicts a schematic diagram illustrating a generated attacker model for inferring personas.

For example, referring to FIG. 3, the processor 110 generates a fake attacker model AM, which includes a projection layer and a softmax activation function layer. The projection layer includes a plurality of fully connected layers. The input sentence (context/content) from the query data QD is inputted into language model (LM) of the chatbot, and then the hidden representations of the LM is inputted to the fake attacker model so as to output one or more inferred personas (result data).

Figure 4:
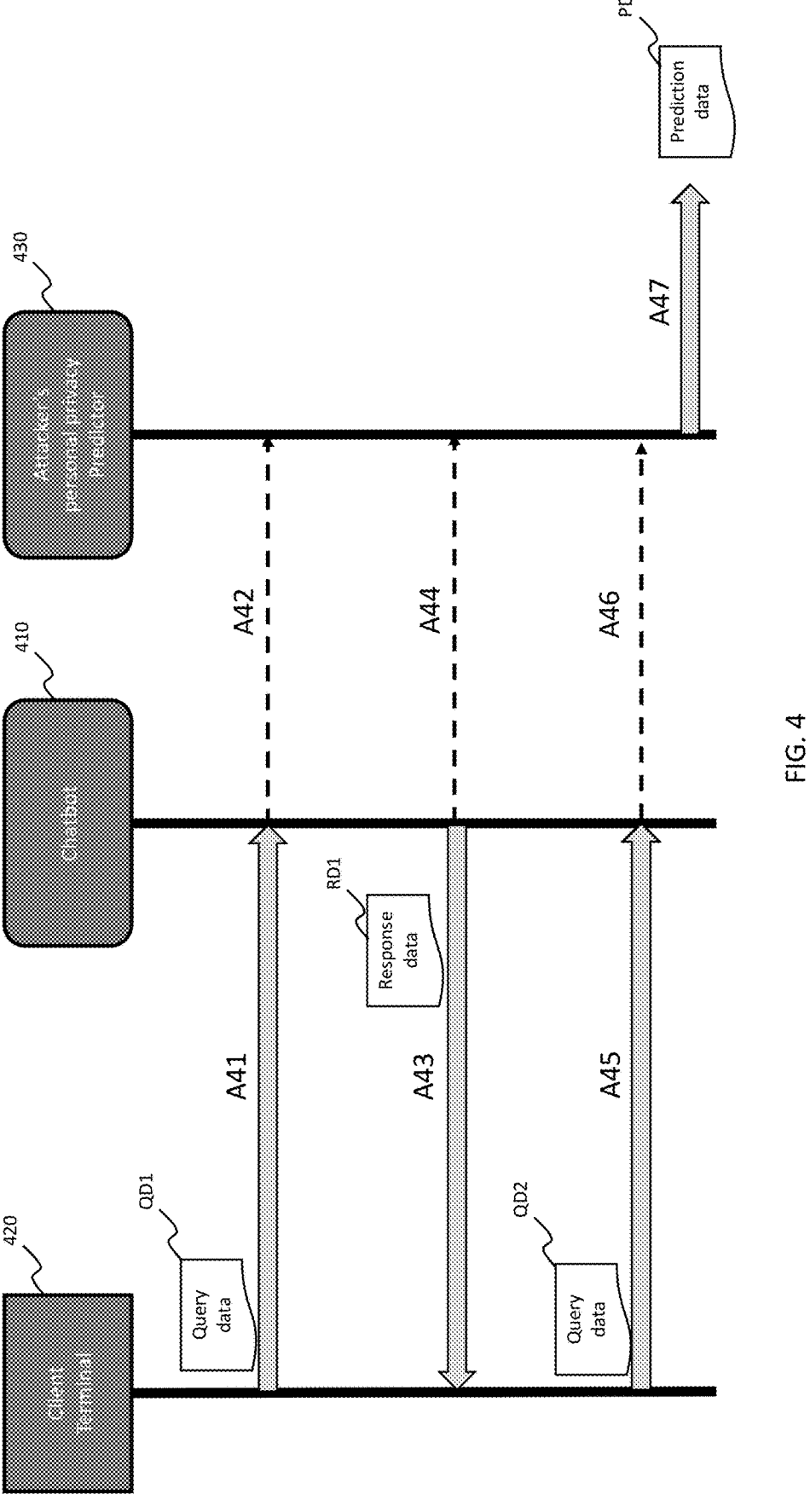
FIG. 4 depicts a schematic diagram illustrating a chatbot defending scenario under a persona inference attacker.

Furthermore, referring to FIG. 4 (a provided training process), as illustrated by arrow A41, a client terminal 420 of a user sends a first query data QD1 to the chatbot 410 (or a service) maintained by the server 100, a first content of the first query data QD1 is obtained by the attacker's persona predictor 430 (or another type of predictor) (as illustrated by arrow A42). The chatbot 410 generates a response data RD1 having a response content corresponding to the content of the query data QD1 (as illustrated by arrow A43), and the response content is obtained by the attacker's persona predictor 430 (as illustrated by arrow A44). Then, the client terminal 420 sends a second query data QD2 to the chatbot 410 (as illustrated by arrow A45), a second content of the second query data QD2 is obtained by the attacker's persona predictor 430 (as illustrated by arrow A46). Finally, the attacker's persona predictor 430 which can be the fake attacker model generated by the processor 110, and the attacker's persona predictor 430 may output a prediction data PD1 having the predicted persona of the user of the client terminal according to the first content, the response content and the second content (as illustrated by arrow A47).

Returning to FIG. 2, in step S230, the processor 110 uses the target LM on the chatbot to defend inference attack, such that the personal privacy of content inputted and sent to the chatbot cannot be predicted by external predictor and security level of the chatbot is assured. It should be noted that the personal privacy is one type of private attribute/information of the corresponding content.

In more detail, there is a GPT-2 based chatbot f pretrained on private conversations D. Only casual language modeling (The GPT-2 model and LN Head) is used to train the chatbot according to formula (1) below:

$$L_f(U; \theta_f) = -\sum_{i=1}^{|U|} \log(Pr(w_i|c, w_0, w_1, \ldots, w_{i-1})) \quad (1)$$

where $L_f$ refers to a loss function of the LM model; f refers to the LM model; $\theta_f$ refers to parameters of the LM; $w_i$ refers to $i^{th}$ word of a sentence; $Pr(w_i|c, w_0, w_1, \ldots w_{i-1})$ refers to a probability distribution for the LM f with a given utterance $U=\{w_0, w_1, \ldots, w_{|U|-1}\}$; c refers to a previous content in a private conversations D.

Furthermore, the negative log likelihood with softmax is applied to estimate the probability distribution $Pr(w_i|c, w_0, w_1, \ldots w_{i-1})$ for target dialog language model f with given utterance $U=\{w_0, w_1, \ldots w_{|U|-1}\}$ and previous context c in D. An adversary owns one external annotated dialog dataset $D_a=\{(bU_1,bs_1), (bU_2,bs_2), \ldots, (bU_n,bs_n)\}$ with n conversations where $bU_i$ indicates a list of utterances $\{u_{i1}, u_{i2}, \ldots, u_{ini}\}$ from i-th conversation and $bs_i$ corresponds to a list of sensitive personas $\{s_{i1}, s_{i2}, \ldots, s_{ini}\}$ for corresponding utterance, wherein the "sensitive" means private information that users are not willing to be disclosed.

Each persona $s_{kj}$ is an integer that can be mapped to its persona according to a predefined dictionary and $0 \geq s_{kj} \geq C-1$, where C is the total number of predefined persona attributes. The goal of the adversary is to infer speakers' personas s from their utterances' embeddings f(u) where u and s refer to any utterance and its persona label. Moreover, u and s are not in $D_a$ and there is no fixed pattern or rule for u.

In another aspect, the detail of the algorithm used for the fake attacker (e.g., a black-box persona inference attack) is described below.

The persona inference attack can be viewed as a supervised classification task. For the black-box attack setup, the adversary can only query the target dialog model f with access to embeddings of adversary's inputs and cannot access or modify model parameters $\theta_f$. As shown in left portion (undefended chatbot) of FIG. 5, the adversary tries to build its persona predictor model $\mathcal{A}$ with its external data $D_a$ and dialog model f. The persona predictor output $\mathcal{A}$(f $(u_{kj})$) is the estimated probability distribution over C persona attributes. Its loss function $L_A$ exploits cross-entropy between the predicted distribution and ground truth distribution that can be presented as formula (2) below:

$$L_{\mathcal{A}p(u_{kj}, s_{kj}; \theta_{\mathcal{A}p})} = CE(\mathcal{A}_p(f(u_{kj})), s_{kj}) \quad (2)$$

where $L_{\mathcal{A}p}$ is the loss function of the fake attacker; CE refers to cross-entropy between persona label $s_{kj}$ and persona predictor's output $\mathcal{A}_p(f(u_{kj}))$. A well-performed persona predictor $\mathcal{A}_p$ can cause great privacy threats. For Machine Learning as a Service (MLaaS), $\mathcal{A}_p$ can be directly applied to perform a man-in-the-middle attack on the application programming interfaces. Moreover, even if raw data is protected and the transmission channel is secure, a curious service provider can train its attacker model $\mathcal{A}_p$ to collect personas of service users.

Regarding the KL Loss, KL loss aims to minimize the Kullback-Leibler divergence between $\mathcal{A}$ (f(u)) and the uniform distribution. It flattens the distribution of $\mathcal{A}$ (f(u)) so that the adversary cannot gain any useful knowledge after training attacker model $\mathcal{A}$. The KL divergence between uniform distribution and $\mathcal{A}$ (f(u)) can be presented as formula (3) below:

$$D_{KL}(UNI\|\mathcal{A}(f(u))) = -\frac{1}{C}\sum \log(CPr(k|f(u), \vartheta_\mathcal{A})) \quad (3)$$

where UNI indicates the uniform distribution and k indicates the k-th persona label. For optimization, it leaves out constant terms and obtain the following loss function as presented by formula (4) below:

$$L_D(u; \vartheta_\mathcal{A}) = -\frac{1}{C}\sum_{k=0}^{C-1} Pr(k|f(u), \vartheta_\mathcal{A}) \quad (4)$$

However, from the perspective of defenders, they have no access to attacker model $\mathcal{A}$ and its parameters. Instead, they can build their own persona predictor as a fake attacker. More specifically, they may mimic the adversary to annotate a dataset $D'_a$ and a persona predictor $\mathcal{A}_p$. Then the KL loss becomes as presented by formula (5) below:

$$L_{kl}(u; \vartheta_{\mathcal{A}p}, \theta_f) = -\frac{1}{C}\sum_{k=0}^{C-1} Pr(k|f(u), \vartheta_{\mathcal{A}p}) \quad (5)$$

where $L_{kl}$ refers to a loss function of the KL loss; $\theta_{\mathcal{A}p}$ refers to parameters of the fake attacker; u refers to utterance (a sentence of a conversation); k refers to persona label index ($k^{th}$ persona label); C refers to a total number of predefined persona attributes; and f(u) refers to hidden states of the chatbot. Furthermore, parameters of the chatbot $\theta_f$ and the fake attacker $\theta_{A_p}$ are updated via KL loss. The chatbot is trained together with a fake attacker to prevent model overlearning by flattening the attacker model's distribution.

Formulas (3)-(5) describe how the KL is transformed to cross entropy losses. During training, after the losses are calculated, the GPT-2 model can be updated through backpropagation (the chain rule).

Regarding the MI Loss, the privacy constraint requires that hidden representations should not reveal the persona attributes. The constraint here is like our defense objectives (conventional training just train the GPT-2 with LM head to improve the generation utility) which can be reached by the provided improved training process method provided by the invention.

In other words, given any utterance u and persona s behind the utterance u, it is desired to minimize the mutual information between f(u) and s as presented by formula (6) below:

$$\min_{\theta_f} I(f(u); s) \tag{6}$$

Performing a related derivation, the upper bound can be presented by formula (7) below:

$$I(f(u);s) \leq \mathbb{E}_{q(f(u))} D_{KL}(q(s|f(u))\|p(s)) \tag{7}$$

where p(s) can be any distribution for s; q(x) refers to probability distribution of model f parameterized by $\theta_f$ and f(u) is assumed to be sampled from the conditional distribution q(f(u)|x,s) (the conditional probability distribution of Y given X is the probability distribution of Y when X is known to be a particular value); $\mathbb{E}$ refers to the expectation with respect to distribution q(x). A conditional distribution is a distribution of values for one variable that exists when you specify the values of other variables. Still, it satisfies all the properties of probability distribution.

However, q(s|f(u)) is hard to estimate. Instead, we use $p_{\Psi}(s|f(u))$ to approximate q(s|f(u)) via minimizing their KL divergence (using a neural network, e.g., persona predictor's probability estimation, to represent $p_{\Psi}(s|f(u)))$ and then we can obtain the following lower bound as presented by formula (8) below:

$$\mathbb{E}_{q(f(u))} D_{KL}(q(s|f(u))\|p(s)) \geq \mathbb{E}_{q(f(u))}[\log p_{\Psi}(s|f(u)) - \log p(s)] \tag{8}$$

Therefore, our objective in formula (6) can be formulated as an adversarial training objective as presented by formula (9) below:

$$\min_{\theta_f} \max_{\Psi} \mathbb{E}_{q(f(u))}[\log p_{\Psi}(s|f(u)) - \log p(s)] \tag{9}$$

$\Psi$ refers to the attacker model that manages to infer s from f(u). Since log p(s) is independent of f(u), and it can be removed from equation (9) to obtain formula (10) below:

$$\min_{\theta_f} \max_{\Psi} \mathbb{E}_{q(f(u))}[\log p_{\Psi}(s|f(u))] \tag{10}$$

Then, formula (10) illustrates an adversarial game between an adversary pip who manages to infer s from f(u) and a defender who modifies $\theta_f$ to protects from persona inference attack. Using the persona predictor model $\mathcal{A}_p$ with softmax activation to learn pip, so as to obtain the final objective for the defender as presented by formula (11) below:

$$\min_{\theta_{\mathcal{A}_p}} \max_{\theta_f} CE(\mathcal{A}_p(f(u)), s) \tag{11}$$

The formula (11) can be rewritten into two losses: $L_{mi1}$ $(u_{kj},s_{kj};\theta_{Ap})=CE(A_p (f(u_{kj})),s_{kj})$ and $L_{mi2}(u_{kj}, s_{kj};\theta_f)=-CE(A_p (f(u_{kj})),s_{kj})$ for the fake adversary (attacker) and the chatbot respectively. Then the MI loss can be formulated as presented by formula (12) below:

$$L_{mi}=\lambda_0 L_{mi1}+L_{mi2} \tag{12}$$

where $\lambda_0$ controls the ratio between two the fake attacker $\mathcal{A}_p$ and the defender f. The ratio is a hyper-parameter that controls the influences of the adversarial game (like a trade-off). After training with defense objectives, f is updated.

Figure 5:
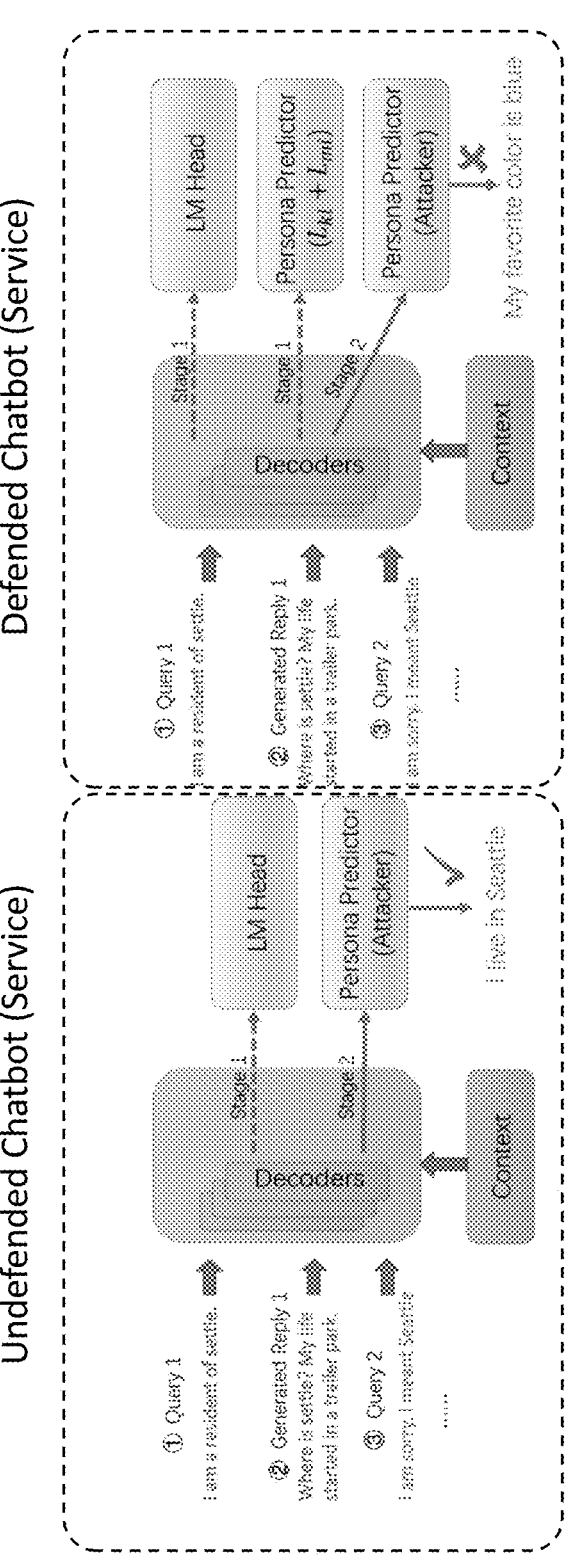
FIG. 5 depicts a schematic diagram illustrating comparison of an undefended chatbot and a defended chatbot.

Referring to the right portion of FIG. 5, it illustrates how the chatbot is trained to address the black-box attack. The loss function for the defender combines KL loss, MI loss and LM loss. Note that the fake adversary objective in MI loss violates KL loss which tries to make the distribution of $\mathcal{A}_p$ be flatten. The proposed loss assigns more weights to the KL loss as presented by formula (13) below:

$$L=L_f+\lambda_1 L_{kl}+\lambda_2 L_{mi} \tag{13}$$

where $\lambda_1$ and $\lambda_2$ are hyper-parameters where $\lambda_1 \geq 10\lambda_2$ to flatten the distribution of $\mathcal{A}_p$. Though the chatbot trained with overall loss L still cannot interfere training process of $\mathcal{A}$ during black-box attacks, L aims to mitigate persona overlearning issues off to address such persona inference attacks.

Referring to FIG. 5, it illustrates the overall pipeline for attack and defense scenarios. The arrows of stage 1 indicate objectives of the GPT-2 and the arrows of stage 2 are used by the adversary. For both left and right portions, the GPT-2 is trained at first and its parameters are all frozen after training. Then the adversary trains its attacker model based on embeddings of the GPT-2.

LM Head is used to perform response content generation. The LM head is also a projection matrix. The final hidden representations perform matrix multiplication with softmax activation to obtain word distributions. Then decoding algorithms can be used to output words (response content).

"Persona predictor" is used to apply defense objectives in stage 1. In stage 2, the GPT-2 model is frozen (no more tuning or update), "Persona predictor" is the attacker model to perform attacks (the dataset held by stage 2 is different from stage 1).

In more detail, Stage 1 refers to training. We need to tune the GPT-2 with defense objectives to make GPT-2 immune to inference attacks. After training from stage 1, the stage 2 indicates the actual attacks on the tuned GPT-2. Then such attacks become ineffective.

Stage 1 is used as tuning process to update the GPT-2 to make it immune to inference attacks. To avoid the attack, the defender needs to mimic the attacker's behavior to update GPT-2 model. Stage 2 is the actual attacks. Defenders cannot know what data is used during attacks (or which attributes are inferred.) Stage 1 and 2 can be viewed as different time steps. Stage 1 happens earlier than stage 2 to avoid the attacks. Please note that in the right portion of FIG. 5, the attacker wrongly predicted the persona "favorite color is blue" because of the effective defense applied on the chatbot.

The defense objective updates the predictor and GPT-2 model through back-propagation. There is no update on the LM head (LM head is updated for generation only).

In the following description, extensive experiment is conducted to evaluate the performance of privacy and utility for the proposed defense learning strategies. In the EXPERIMENTAL SETTING section, it describes related experimental setting. In PRIVACY Section, it shows that the attacker performance to measure how privacy is protected. In UTILITY section, it uses automatic metrics to evaluate the utility of our chatbot after applying defense mechanisms. In ABLATION STUDY Section, it performs ablation study on defense objectives.

Experimental Setting

To train the GPT-2 as our chatbot, a DialoGPT model is used which is pretrained on Reddit comment chains. Then PersonaChat dataset is used to fine-tune the GPT-2 LM of the chatbot. To obtain annotated dataset $D_a$ for the adversary, aligning personas to corresponding utterances through positive (utterance, persona) pairs provided in Dialogue NLI (Natural Language Inference) dataset. For those utterances with no annotated personas, assigning label −1 to them. Reshuffling the dataset to balance the label distribution among train/val/test datasets and divide them with ratio 82:9:9. Firstly, letting the attacker and defender share the same training data. In later sections, separating the annotated data for the adversary and defender with no overlap. A summary statistics of Dais shown in Table 1 below.

TABLE 1

Statistics of aligned dataset.

| Stat Type | Value |
| --- | --- |
| Dialogs | 10,907 |
| Utterances (turns) | 162,064 |
| Unique personas | 4,332 |
| Total personas | 98,056 |
| Labeled turns | 32,147 |
| Avg. turns per dialog | 14.86 |
| Avg. labeled turns per dialog | 2.95 |
| Avg. words per turn | 11.71 |

Regarding the fake attacker model, in the experiment, it uses a 2 layer neural network with cross-entropy loss as the fake attacker model. The fake attacker model exploits the final layer embedding of the last token "i-endoftext-¿" from the GPT-2 as model input. Also, it tries other attacker model architectures (transformer block based attackers) and input embeddings (average of all embeddings in the final layer of GPT-2), but the attacking performance is worse than the 2 layer model mentioned above.

Regarding the training details, for each conversation (as integrated in each training data TD), the utterances are concatenated by the special token "i-endoftext-¿" to train the GPT-2. To decode outputs from GPT-2, it applies the Nucleus Sampling method. Setting top-p=0.9 with temperature coefficient 0.9 to sample words from the GPT-2. For optimization, setting 2 AdamW optimizers for the chatbot and the persona predictor respectively. The learning rate is 3e-5 with linear warm-up and decay. For hyper-parameters, it sets $\lambda 0=1$, $\lambda 1=10$ and $\lambda 2=1$.

Regarding the evaluation metrics, the evaluation metrics are based on privacy and utility. For privacy, we use persona inference accuracy and weighted F1-score to evaluate the attacker performance. For utility, we apply BERTScore, Distinct, BLEU and Perplexity (PPL) as evaluation metrics. BERTScore and BLEU are used to measure similarity between generated outputs and ground truth while Distinct (Dist) focuses on the diversity. Perplexity shows the uncertainty when the LM model fits the data.

Privacy.

The attacking performance of the fake attacker model $\mathcal{A}$ is listed in multiple scenarios shown in Table 2 below, wherein Acc refers to test persona inference accuracy; F1 uses weighted average F1-score for 4332 persona labels; Max-Ratio indicates the ratio that the most frequent prediction shares among all predictions. The worse the attack model performs, the better privacy protection can be achieved.

TABLE 2

Evaluation on the privacy.

| 4332 | Acc (%) | F1 | Max-Ratio (%) |
| --- | --- | --- | --- |
| Random Pred | 0 | 0 | — |
| Best Guess | 0.72 | 1.02e−3 | 0.72 |
| LM | 37.59 | 0.37 | 1.34 |
| LM + KL + MI | 0.53 | 6.78e−5 | 81.87 |
| LM + KL | 14.43 | 0.11 | 10.60 |
| LM + MI | 0.53 | 5.57e−5 | 99.84 |
| Imbalance | 0.47 | 1.90e−3 | 94.06 |

| 8 | Acc (%) | F1 | Max-Ratio (%) |
| --- | --- | --- | --- |
| Random Pred | 34.42 | 0.35 | — |
| Best Guess | 56.84 | 0.41 | 56.84 |
| LM + KL + MI | 28.68 | 0.37 | 58.15 |

To demonstrate the overlearning issue of GPT-2, considering 2 baseline attacks. If the adversary has no knowledge about persona attributes distribution, then he can randomly guess over 4332 labels (Random Pred). Otherwise, the adversary can perform Best Guess that only guess the most frequent persona in the dataset. LM indicates only language modeling objective is applied to train the chatbot without any defense mechanism. From the table, the test persona inference accuracy on the LM achieves 37.59% while guessing on the label with most occurrences merely has 0.72% accuracy. That is, the black-box persona inference attack has 52× the accuracy of guessing. The huge performance gap between the attacker model and the baseline guess method indicates that simple language modeling objective has serious overlearning issues that captures personal privacies of speakers unintentionally.

To avoid the persona overlearning issue, the additional defense objectives is used as mentioned above. LM+KL+MI utilizes language model, KL loss and MI loss in formula (13) to train the GPT-2. As demonstrated in Table 2, LM+KL+MI significantly reduce the attacking accuracy from 37.59% to 0.53% and F1-score drops from 0.37 to nearly 0. This defense mechanism can even outperform Best Guess in terms of privacy protection. That is, even the adversary annotates its own dataset to train an attacker model, the attacking performance is still worse than simply guessing the most frequent label. As a result, the black-box persona prediction attack becomes useless after applying the overall loss for the chatbot. The adversary cannot obtain any speaker's persona from the embedding f(u) by training its persona predictor.

To learn why the proposed overall loss works so well, the ratio of most frequent predicted label among all predictions is examined. Table 2 reveals that the most frequent label in the test set has ratio 0.72%. After applying KL loss and MI loss, the attacker model tends to make predictions on a single label. For LM+KL+MI, the Max-Ratio even occupies 81.87% predictions. This implies that the proposed defense strategies have the potential to "fool" the attacker model to make wrong predictions on a single slot. Overall, the above experiment demonstrates that the provided defense learning strategies can effectively mitigate the persona overlearning issue and avoid black-box persona inference attacks.

Utility.

Besides privacy, utility is another key objective to train a chatbot. Several automatic metrics are considered to evaluate the generation performance. For generation, GPT-2 is used to generate responses of the second speaker (Speaker B in FIG. 1) with all previous turns as context. Then, the generated model outputs are compared with ground truth replies. It uses Dist-1 and Dist-2 to count ratios of distinct unigram and bigram. BLEU-1, BLEU-2 and BLEU-4 are applied to evaluate generation similarity with ground truth. Due to the one-to-many nature of chit-chats, the BLEU is not adequate to compare generated responses with ground truth. Hence, Precision, Recall and Precision of BERTScore are adapted to measure the similarity in the embedding space.

The evaluation result is shown in Table 3 below.

TABLE 3

| Evaluation on the utility over 4332 persona labels. | | | | | | | | |
| --- | --- | --- | --- | --- | --- | --- | --- | --- |
| | Distinct(↑) | | BLEU(↑) | | | BERTScore(↑) | | |
| | PPL(↓) | Dist-1 | Dist-2 | BLEU-1 | BLEU-2 | BLEU-4 | Precision | Recall | F1 |
| LM | 14.821 | 0.952 | 0.879 | 0.121 | 0.0551 | 0.0123 | 0.860 | 0.843 | 0.851 |
| LM + KL | 28.926 | 0.954 | 0.880 | 0.121 | 0.0558 | 0.0130 | 0.859 | 0.844 | 0.851 |
| LM + MI | 18.74 | 0.953 | 0.880 | 0.118 | 0.0531 | 0.0121 | 0.859 | 0.843 | 0.851 |
| LM + KL + MI | 19.674 | 0.953 | 0.880 | 0.119 | 0.0525 | 0.0105 | 0.858 | 0.842 | 0.850 |

LM is the baseline GPT-2 without any defense mechanism. Adding KL loss will increase the perplexity greatly from 14.8 to 28.9. After combining KL loss with MI loss, its perplexity decreases to 19.674. A plausible explanation is that KL loss confuses the persona predictor and indirectly increase the uncertainty of the GPT-2. All GPT-2 models have relatively low BLEU scores due to the one-to-many mapping between contexts and responses. For Distinct and BERTScore, there are only minor differences between the baseline LM and GPT-2 with defense mechanisms. Though the uncertainty increases after applying KL loss and MI loss, it does no harm to the quality of generation. In summary, there is almost no negative influence on the utility after applying the provided defense strategies.

Ablation Study.

To show the effectiveness of proposed KL loss and MI loss and how they affect the performance of black-box persona inference attack, the inclusion and exclusion of proposed defense objectives are considered. The result is shown in Table 2. LM+KL indicates the GPT-2 is trained with language modeling and KL loss in formula (1) and (5). LM+MI applies language modeling and MI loss in formula (1) and (12) to train the GPT-2. LM+KL+MI utilizes language model, KL loss and MI loss in formula (13) to train the GPT-2. From the table, it can be seen that all three models are able to reduce test accuracy of the black-box attacks. The KL loss is weaker from the perspective of defense, but it tends to flatten the estimated persona distribution with much smaller Max-Ratio. The LM+MI shares similar test accuracy and F1-score with LM+KL+MI, but nearly all predictions are made on a single persona label with ratio 99.84%. After KL loss is applied on LM+KL+MI, the Max-Ratio drops to 81.87%. As discussed earlier, high Max-Ratio may also cause privacy leakage. If the adversary knows the persona with Max-Ratio, it can improve the guess by not predicting this persona, which is a threat for fewer persona labels (for example, binary classification). This result verifies that KL loss introduces flatter estimation and MI loss is effective against persona overlearning.

Previous black-box attacks usually assume that the annotated dataset $D_a$ must share similar data distribution with defender's training data. To examine the performance of defense strategies on unseen personas, assigning the adversary's dataset $D_a$ with labels that cannot be acquired by the defender. Splitting data with 500 persona labels that are uniquely held by the adversary.

Imbalance of Table 2 shows the attacker performance on the imbalanced data distribution setup. The persona inference accuracy is still very low and the attacker model tends to predict more on a single persona label than balanced data distribution setup. This result shows that the proposed overall loss can also prevent black-box persona inference attacks on unseen personas and verifies previous suggestions that combining LM loss with MI loss in the training process may fool the attacker model to make wrong predictions.

The above experiment is conducted based on 4332 persona labels. In fact, many personas share the similar meanings and can be further clustered. Besides, it is also practical to consider defense performance on smaller label space. Using Sentence-BERT to embed all persona sentences and perform k-means clustering on the embeddings to obtain 8 clusters. The embeddings are the vector representations from the model to represent the words. Then, manually checking these clusters and classified them as cars, food, animals (pets), family information, hobbies, jobs, personal information, and music taste respectively. Follow the data (splitted data with 500 persona mentioned above) split above, we assign data in first 3 clusters only to the adversary to make the data distribution imbalanced.

The attacking performance is given in the lower part of Table 2. For imbalanced data distribution with a small label space, the provided defenses achieve lower attack accuracy compared with Random Pred and Best Guess. However, the F1-score of Imbalance is slightly higher than Random Pred. In addition, Max-Ratio with 8 clusters is much smaller than 4332 labels even though the distribution of 8 clusters is obviously tighter. This implies that for the smaller label space, the provided defense mechanisms are not as robust as before. Still, the defense method is effective.

To make prediction on personas, the argmax function is used for the estimated distribution of persona predictors. However, the internal distribution conveys crucial information about how the persona predictors estimates f(u). It follows setup of imbalanced data split of 8 clusters mentioned above to examine persona predictors of attacker $\mathcal{A}$ and fake attacker $\mathcal{A}_p$.

Table 4 below lists the detailed average distribution over the 8 labels for the test set, Attacker $\mathcal{A}$ and Fake Attacker $\mathcal{A}_p$. In table 4, $KL_{data}$ refers to the KL divergence with the Data distribution and $KL_{uni}$ indicates the KL divergence with uniform distribution. Note that Fake Attacker only has access to last 5 labels and its $KL_{uni}$ is calculated only based on these 5 labels while $KL_{uni}$ of Attacker considers all 8 labels.

TABLE 4

| | 0 | 1 | 2 | 3 | 4 | 5 | 6 | 7 | $KL_{data}$ | $KL_{uni}$ |
|---|---|---|---|---|---|---|---|---|---|---|
| Data | 0.055 | 0.20 | 0.10 | 0.092 | 0.18 | 0.082 | 0.23 | 0.059 | 0 | 0.13 |
| Attacker | 0.061 | 0.23 | 0.16 | 0.071 | 0.17 | 0.068 | 0.18 | 0.055 | 0.025 | 0.14 |
| Fake Attacker | 0.0085 | 0.0087 | 0.0084 | 0.16 | 0.24 | 0.15 | 0.27 | 0.14 | 0.74 | 0.035 |

The test set distribution and average estimated distribution of persona predictors over 8 clusters.

Moreover, it also calculates their KL divergence with ground truth distribution and uniform distribution. Fake Attacker tends to have large difference with Data and tries to flatten its distribution among its own training set (the last 5 labels). This behavior conforms our training objectives that aim to flatten the distribution and deviate from the ground truth distribution. For Attacker, its distribution seems close to the ground truth distribution. This indicates that the attacker model $\mathcal{A}$ can still learn statistical information about personas. However, its attacking performance is poor in terms of Imbalance from Table 2. The poor performance implies our proposed defense learning strategies may obfuscate Attacker for estimating single sample f(u) and finally make the wrong prediction.

To show an intuition view on utility, one generation sample shown in Table 5 below is provided.

TABLE 5

Dialog generation example on Speaker B. All previous utterances between A and B are used as context to generate responses.

Speaker A: Hello, how are you tonight?
Speaker B: Hello my friend. I am well.
LM: I am fine and you?
LM + KL + MI: Hi, I am good, you? What do you like to do for fun?
Speaker A: Good, glad to hear it. What do you do for fun?
Speaker B: I ride around the town on my cool bicycle.
LM: I like to go to the beach.
LM + KL + MI: I collect civil war antiques, and to read, you?
Speaker A: Really? I really like mountain bike too.
Speaker B: I wish I lived in the mountains.
Speaker A: Do you like nature? I have been to 12 national parks.
Speaker B: I love nature. I like looking at plants.
Speaker A: I love plants too, and hiking. In fact, I am actually an environmental activist. Speaker B: Cool, I am a vegan.
Speaker A: Nice, do you have a favorite food?
Speaker B: My favorite dish is lentil curry.
LM: I do not like meat.
LM + KL + MI: I do not eat meat.
Speaker A: I have never had that, but I want to try it now.
Speaker B: What do you like to do the most?
LM: It is very good. I also really enjoy watching funny videos of comedians.
LM + KL + MI: It is amazing. My wife makes it.

Both LM and LM+KL+MI are able to generate fluent and proper relies. Moreover, they tend to maintain the coherence with previous contexts. For example, it is mentioned in context that Speaker B is a vegan and both chatbots response that they do not eat meat for the food preference. This generation example shows that proposed defense learning objectives preserve the model utility.

Although the provided method above is for defending a chatbot from the persona attack, but the invention is nor limited hereto. The provided method can be applied for preventing leaking a personal privacy from a service under black-box personal privacy inference attack, wherein the service is provided via a neural network executed by a processor of a server. For example, referring to FIG. 6, in step S610, the processor trains a main algorithm model of the service according to utility objectives. Next, in step S620, the processor 110 applies one or more defense objectives with attribute predictor to fine-tune a target main algorithm model of the service by using a fake attacker model and the trained main algorithm model and pre-define attributes with annotated datasets. Next, in step S630, the processor 110 uses the target main algorithm model on the service to defend inference attack, such that the personal privacy of content inputted and sent to the service cannot be predicted by external predictor and security level of the service is assured.

Based on above, it shows that LM based chatbots tend to reveal personas of speakers and propose effective defense objectives to prevent GPT-2 from black-box persona inference attacks. Unlike other convention arts that suffer from utility degradation, our defense learning strategies do no harm to the powerful generation ability of LM based chatbots. Furthermore, extensive experiments are conducted to evaluate both privacy and utility. The black-box persona inference attacks are performed under various setups to demonstrate robustness of proposed defense learning strategies. In addition, automatic metrics are used to show that proposed defense learning strategies maintain the utility.

The functional units of the apparatuses and the methods in accordance to embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer-implemented method for preventing leaking a personal privacy from a chatbot under black-box persona inference attack, wherein the chatbot is provided via a neural network executed by a processor of a server, the method comprises:

training, by the processor, a Language Model (LM) of the chatbot according to utility objectives;

applying, by the processor, one or more defense objectives with personal attribute predictor to fine-tune the LM of the chatbot by using a fake attacker model and pre-defined attributes with annotated datasets, wherein the fake attacker is used as a rehearsal to update the LM in place of real attacker model details for updating the LM during actual attacks; and using, by the processor, the fine-tuned LM on the chatbot to defend inference attack, such that the personal privacy of content inputted and sent to the chatbot cannot be predicted by an external predictor and a security level of the chatbot is assured;

wherein the utility objectives comprising a LM loss; and wherein the LM loss is an objective function of the LM, and the objective function is presented by a formula below:

$$L_f(U; \theta_f) = -\sum_{i=1}^{|U|} \log(Pr(w_i|c, w_0, w_1, \ldots, w_{i-1}))$$

where $L_f$ refers to a loss function of the LM model; f refers to the LM model; $\theta_f$ refers to parameters of the LM; $w_i$ refers to $i^{th}$ word of a sentence; $Pr(w_i|c, w_0, w_1, \ldots, w_{i-1})$ refers to a probability distribution for the LM f with a given utterance $U=\{w_0, w_1, \ldots, w_{|U|-1}\}$; c refers to a previous content in a private conversations D;

wherein the LM of the chatbot is fine-tuned by:

sending, by a client terminal of a user, a first query data to the chatbot;

obtaining by the fake attacker model, a first content of the first query data, generating by the LM of the chatbot, a response data having a response content corresponding to the content of the query data;

obtaining, by the fake attacker model, the response content;

sending, by the client terminal a second query data to the chatbot;

obtaining, by the fake attacker model, a second content of the second query data; and outputting, by the fake model, a prediction data having a predicted persona of the user according to the first content, the response content and the second content.

2. The method of claim 1, wherein the defense objectives comprising one or a combination of following:

a KL (Kullback-Leibler) loss; and a MI (Mutual Information) loss.

3. The method of claim 2, wherein an objective function of the KL loss is presented by a formula below:

$$L_{kl}(u; \vartheta_{A_p}, \theta_f) = -\frac{1}{C} \sum_{k=0}^{C-1} Pr(k|f(u), \vartheta_{A_p})$$

where $L_{kl}$ refers to a loss function of the KL loss; $\theta_{A_p}$ refers to parameters of the fake attacker; u refers to utterance; k refers to personal attribute label index; C refers to a total number of predefined personal attributes; and f(u) refers to hidden states of the chatbot.

4. The method of claim 2, wherein an objective function of the MI loss is presented by a formula below:

$$\min_{\theta_f} \max_{\Psi} \mathbb{E}_{q(f(u))}[\log p_\Psi(s|f(u))]$$

where $E_q$ refers to a loss function of the KL loss; $p_\Psi(s|f(u))$ refers to a distribution function used to approximate $q(s|f(u))$ which refers to probability distribution of model f parameterized by $\theta_f$, $\Psi$ refers to the attacker model that manages to infer s from f(u).

5. The method of claim 1, wherein the fake attacker comprises:

a projection layer comprising a plurality of fully connected layers; and a softmax activation function layer.

6. The method of claim 5, wherein a loss function of the fake attacker is presented by a formula below:

$$L_{A_p}(u_{kj}, s_{kj}; \theta_{A_p}) = CE(A_p(f(u_{kj})), s_{kj})$$

where $L_{A_p}$ is the loss function of the fake attacker; $u_{kj}$ represents j-th utterance from k-th conversation; CE refers to cross-entropy between personal label $s_{kj}$ and personal attribute predictor's output $A_p(f(u_{kj}))$; and $\theta_{A_p}$ represents parameters of a persona predictor model $A$ of the fake attacker.

7. A server for preventing leaking a personal privacy from a chatbot under black-box personal attribute inference attack, wherein the chatbot is provided via a neural network executed by a processor of the server, comprising:

the processor, configured to execute machine instructions to implement a computer-implemented method, the method comprising:

training, by the processor, a Language Model (LM) of the chatbot according to utility objectives;

applying, by the processor, one or more defense objectives with personal attribute predictor to fine-tune the LM of the chatbot by using a fake attacker model and pre-defined attributes with annotated datasets, wherein the fake attacker is used as a rehearsal to update the LM in place of real attacker model details for updating the LM during actual attacks; and using, by the processor, the fine-tuned LM on the chatbot to defend inference attack, such that the personal privacy of content inputted and sent to the chatbot cannot be predicted by an external predictor; and a security level of the chatbot is assured;

wherein the utility objectives comprising a LM loss; and wherein the LM loss is an objective function of the LM, and the objective function is presented by a formula below:

$$L_f(U; \theta_f) = -\sum_{i=1}^{|U|} \log(Pr(w_i|c, w_0, w_1, \ldots, w_{i-1}))$$

where $L_f$ refers to a loss function of the LM model; f refers to the LM model; $\theta_f$ refers to parameters of the LM; $w_i$ refers to $i^{th}$ word of a sentence; $Pr(w_i|c, w_0, w_1, \ldots, w_{i-1})$ refers to a probability distribution for the LM f with a given utterance $U=\{w_0, w_1, \ldots, w_{|U|-1}\}$; c refers to a previous content in a private conversations D;

wherein the LM of the chatbot is fine-tuned by:

sending, by a client terminal of a user, a first query data to the chatbot;

obtaining, by the fake attacker model, a first content of the first query data;

generating, by the IM of the chatbot, a response data having a response content corresponding to the content of the query data;

obtaining by the fake attacker model, the response content;

sending by the client terminal, a second query data to the chatbot;

obtaining, by the fake attacker model, a second content of the second query data; and outputting by the fake attacker model, a prediction data having a predicted persona of the user according to the first content the response content and the second content.

8. The server of claim 7, wherein the defense objectives comprising one or a combination of following:

a KL (Kullback-Leibler) loss; and a MI (Mutual Information) loss.

9. The server of claim 8, wherein an objective function of the KL loss is presented by a formula below:

$$L_{kl}(u; \theta_{A_p}, \theta_f) = -\frac{1}{C}\sum_{k=0}^{C-1} Pr(k|f(u), \theta_{A_p})$$

where $L_{kl}$ refers to a loss function of the KL loss; $\theta_{A_p}$ refers to parameters of the fake attacker; u refers to utterance; k refers to personal attribute label index; C refers to a total number of predefined personal attributes; and f(u) refers to hidden states of the chatbot.

10. The server of claim 8, wherein an objective function of the MI loss is presented by a formula below:

$$\min_{\theta_f} \max_{\Psi} \mathbb{E}_{q(f(u))}[\log p_\Psi(s|f(u))]$$

where $E_q$ refers to a loss function of the KL loss; $p_\Psi(s|f(u))$ refers to a distribution function used to approximate $q(s|f(u))$ which refers to probability distribution of model f parameterized by $\theta_f$; $\Psi$ refers to the attacker model that manages to infer s from f(u).

11. The server of claim 7, wherein the fake attacker comprises:

a projection layer comprising a plurality of fully connected layers; and a softmax activation function layer.

12. The server of claim 11, wherein a loss function of the fake attacker is presented by a formula below:

$$L_{A_p(u_{kj}, s_{kj})}, \theta_{A_p}) = CE(A_p(f(u_{kj}), s_{kj})$$

where $L_{A_p}$ is the loss function of the fake attacker; $u_{kj}$ represents j-th utterance from k-th conversation; CE refers to cross-entropy between personal attribute label $s_{kj}$ and personal attribute predictor's output $A_p(f(u_{kj}))$;

and $\theta_{A_p}$ represents parameters of a persona predictor model $A_p$ of the fake attacker.

13. A computer-implemented method for preventing leaking a personal privacy from a service under personal privacy inference attack, wherein the service is provided via a neural network executed by a processor of a server, the method comprises:

training, by the processor, a main algorithm model of the service according to utility objectives;

applying, by the processor, one or more defense objectives with attribute predictor to fine-tune the main algorithm model of the service by using a fake attacker model and pre-defined attributes with annotated datasets, wherein the fake attacker is used as a rehearsal to update the main algorithm model in place of the real attacker model details for updating the main algorithm model during actual attacks; and using, by the processor, the ta fine-tuned main algorithm model on the service to defend inference attack, such that the personal privacy of content inputted and sent to the service cannot be predicted by an external predictor; and a security level of the service is assured;

wherein the utility objectives comprising a LM loss; and wherein the LM loss is an objective function of the main algorithm model, and the objective function is presented by a formula below:

$$L_f(U; \theta_f) = -\sum_{i=1}^{|U|} \log(Pr(w_i | c, w_0, w_1, \ldots, w_{i-1}))$$

where $L_f$ refers to a loss function of the main algorithm model; f refers to the main algorithm model; $\theta_f$ refers to parameters of the main algorithm model; $w_i$ refers to $i^{th}$ word of a sentence; $Pr(w_i|c, w_0, w_1, \ldots, w_{i-1})$ refers to a probability distribution for the main algorithm model f with a given utterance $U=\{w_0, w_1, \ldots, w_{|U|-1}\}$; c refers to a previous content in a private conversations D;

wherein the main algorithm model of the chatbot is fine tuned by:

sending, by a client terminal of a user, a first query data to the chatbot;

obtaining, by the fake attacker model, a first content of the first query data;

generating, by the main algorithm model of the chatbot, a response data having a response content corresponding to the content of the query data;

obtaining by the fake attacker model, the response content;

sending, by the client terminal, a second query data to the chatbot;

obtaining, by the fake attacker model a second content of the second query data, and outputting by the fake attacker model, a prediction data having a predicted persona of the user according to the first content, the response content and the second content.

* * * * *